(12) United States Patent
Peterson et al.

(10) Patent No.: US 12,479,358 B2
(45) Date of Patent: Nov. 25, 2025

(54) OVERHEAD CONSOLE ACCESSORY SYSTEM WITH SHARED CONTROLS, CAMERAS, AND LIGHTING

(71) Applicants: Magna Mirrors of America, Inc., Holland, MI (US); Magna Electronics Inc., Auburn Hills, MI (US)

(72) Inventors: Austen C. Peterson, Hudsonville, MI (US); Yuesheng Lu, Farmington Hills, MI (US)

(73) Assignees: Magna Mirrors of America, Inc., Holland, MI (US); Magna Electronics Inc., Auburn Hills, MI (US)

( * ) Notice: Subject to any disclaimer, the term of this patent is extended or adjusted under 35 U.S.C. 154(b) by 521 days.

(21) Appl. No.: 17/931,988

(22) Filed: Sep. 14, 2022

(65) Prior Publication Data

US 2023/0078512 A1  Mar. 16, 2023

Related U.S. Application Data

(60) Provisional application No. 63/261,158, filed on Sep. 14, 2021.

(51) Int. Cl.
| | |
|---|---|
| *B60R 1/04* | (2006.01) |
| *B60K 35/60* | (2024.01) |
| *B60Q 3/20* | (2017.01) |
| *B60Q 3/258* | (2017.01) |
| *B60Q 3/50* | (2017.01) |
| *B60Q 3/51* | (2017.01) |
| *B60Q 3/80* | (2017.01) |
| *B60R 1/12* | (2006.01) |

(52) U.S. Cl.
CPC ............... *B60Q 3/258* (2017.02); *B60K 35/60* (2024.01); *B60Q 3/20* (2017.02); *B60Q 3/50* (2017.02); *B60Q 3/51* (2017.02); *B60Q 3/80* (2017.02); *B60R 1/04* (2013.01); *B60R 1/1207* (2013.01)

(58) Field of Classification Search
CPC ........... B60R 1/04; B60R 1/1207; B60Q 3/20; B60Q 3/50; B60Q 3/51; B60Q 3/80; B60Q 3/258
USPC ........................................ 359/843; 362/494
See application file for complete search history.

(56) References Cited

U.S. PATENT DOCUMENTS

| | | | |
|---|---|---|---|
| 4,712,879 A | 12/1987 | Lynam et al. | |
| 5,073,012 A | 12/1991 | Lynam | |
| 5,076,673 A | 12/1991 | Lynam et al. | |
| 5,117,346 A | 5/1992 | Gard | |

(Continued)

*Primary Examiner* — Ricky D Shafer
(74) *Attorney, Agent, or Firm* — HONIGMAN LLP

(57) ABSTRACT

A vehicular accessory system includes an overhead console configured to mount at an interior portion of a vehicle, and an interior rearview mirror assembly having a mirror head mounted via mounting structure at the overhead console. The overhead console includes a base portion configured to attach at the interior portion of the vehicle to mount the overhead console at the interior portion and an extending portion that, with the overhead console mounted at the interior portion of the vehicle, extends from the base portion along and spaced from a headliner of the vehicle. The overhead console includes a light source that, with the overhead console mounted at the interior portion of the vehicle, and when electrically operated to emit light, light emitted by the light source illuminates a surface at the interior portion of the vehicle above the overhead console.

25 Claims, 2 Drawing Sheets

(56) References Cited

U.S. PATENT DOCUMENTS

| | | |
|---|---|---|
| 5,140,455 A | 8/1992 | Varaprasad et al. |
| 5,142,407 A | 8/1992 | Varaprasad et al. |
| 5,151,816 A | 9/1992 | Varaprasad et al. |
| 5,223,814 A * | 6/1993 | Suman .................... B60R 1/12 |
| | | 250/214 AL |
| 5,253,109 A | 10/1993 | O'Farrell et al. |
| 5,406,414 A | 4/1995 | O'Farrell et al. |
| 5,469,298 A * | 11/1995 | Suman .................. G02B 27/01 |
| | | 359/872 |
| 5,525,264 A | 6/1996 | Cronin et al. |
| 5,548,492 A * | 8/1996 | Hansen .................. B60Q 3/66 |
| | | 362/140 |
| 5,567,360 A | 10/1996 | Varaprasad et al. |
| 5,576,898 A * | 11/1996 | Rubin ................... B60R 1/008 |
| | | 359/872 |
| 5,610,756 A | 3/1997 | Lynam et al. |
| 5,668,663 A | 9/1997 | Varaprasad et al. |
| 5,724,187 A | 3/1998 | Varaprasad et al. |
| 5,910,854 A | 6/1999 | Varaprasad et al. |
| 6,002,544 A | 12/1999 | Yatsu |
| 6,154,306 A | 11/2000 | Varaprasad et al. |
| 6,178,034 B1 | 1/2001 | Allemand et al. |
| 6,690,268 B2 * | 2/2004 | Schofield ................ B60Q 1/22 |
| | | 348/148 |
| 7,184,190 B2 | 2/2007 | McCabe et al. |
| 7,195,381 B2 | 3/2007 | Lynam et al. |
| 7,255,451 B2 | 8/2007 | McCabe et al. |
| 7,274,501 B2 | 9/2007 | McCabe et al. |
| 7,289,037 B2 | 10/2007 | Uken et al. |
| 7,360,932 B2 | 4/2008 | Uken et al. |
| 7,626,749 B2 | 12/2009 | Baur et al. |
| 7,914,187 B2 | 3/2011 | Higgins-Luthman et al. |
| 8,049,640 B2 | 11/2011 | Uken et al. |
| 8,277,059 B2 | 10/2012 | McCabe et al. |
| 8,529,108 B2 | 9/2013 | Uken et al. |
| 9,405,120 B2 | 8/2016 | Graf et al. |
| 10,017,114 B2 | 7/2018 | Bongwald |
| 10,046,706 B2 | 8/2018 | Larson et al. |
| 10,065,574 B2 | 9/2018 | Tiryaki |
| 10,166,924 B2 | 1/2019 | Baur |
| 10,421,404 B2 | 9/2019 | Larson et al. |
| 10,442,360 B2 | 10/2019 | LaCross et al. |
| 11,639,134 B1 | 5/2023 | Huizen et al. |
| 11,780,372 B2 | 10/2023 | Sobecki et al. |
| 11,930,264 B2 | 3/2024 | Conger et al. |
| 2001/0013825 A1 * | 8/2001 | DeLine .................. B60K 35/22 |
| | | 340/425.5 |
| 2002/0093826 A1 * | 7/2002 | Bos ......................... B60Q 3/85 |
| | | 362/135 |
| 2002/0190872 A1 * | 12/2002 | Suman .................... H04B 1/202 |
| | | 340/12.22 |
| 2003/0020603 A1 * | 1/2003 | DeLine ................ G06Q 20/341 |
| | | 340/425.5 |
| 2004/0184282 A1 * | 9/2004 | Nishijima ................ B60R 1/12 |
| | | 362/516 |
| 2005/0134073 A1 * | 6/2005 | Tokutomi .................. B60R 7/04 |
| | | 296/37.8 |
| 2014/0336876 A1 | 11/2014 | Gieseke et al. |
| 2015/0009010 A1 | 1/2015 | Biemer |
| 2015/0015710 A1 | 1/2015 | Tiryaki |
| 2015/0022664 A1 | 1/2015 | Pflug et al. |
| 2015/0092042 A1 | 4/2015 | Fursich |
| 2015/0232030 A1 | 8/2015 | Bongwald |
| 2015/0294169 A1 | 10/2015 | Zhou et al. |
| 2015/0296135 A1 | 10/2015 | Wacquant et al. |
| 2015/0352953 A1 | 12/2015 | Koravadi |
| 2016/0137126 A1 | 5/2016 | Fursich et al. |
| 2016/0209647 A1 | 7/2016 | Fursich |
| 2017/0217367 A1 | 8/2017 | Pflug et al. |
| 2017/0274906 A1 | 9/2017 | Hassan et al. |
| 2017/0355312 A1 | 12/2017 | Habibi et al. |
| 2018/0222414 A1 | 8/2018 | Ihlenburg et al. |
| 2018/0231976 A1 | 8/2018 | Singh |
| 2019/0118717 A1 | 4/2019 | Blank et al. |
| 2019/0146297 A1 | 5/2019 | Lynam et al. |
| 2019/0210615 A1 | 7/2019 | Caron et al. |
| 2019/0258131 A9 | 8/2019 | Lynam et al. |
| 2020/0143560 A1 | 5/2020 | Lu et al. |
| 2020/0202151 A1 | 6/2020 | Wacquant |
| 2020/0320320 A1 | 10/2020 | Lynam |
| 2020/0377022 A1 | 12/2020 | LaCross et al. |
| 2021/0155167 A1 | 5/2021 | Lynam et al. |
| 2021/0162926 A1 | 6/2021 | Lu |
| 2021/0188092 A1 | 6/2021 | Peterson |
| 2021/0245662 A1 | 8/2021 | Blank et al. |
| 2021/0291739 A1 | 9/2021 | Kasarla et al. |
| 2021/0323473 A1 | 10/2021 | Peterson et al. |
| 2022/0111857 A1 | 4/2022 | Kulkarni |
| 2022/0242438 A1 | 8/2022 | Sobecki et al. |
| 2022/0254132 A1 | 8/2022 | Rother |
| 2023/0010223 A1 * | 1/2023 | Andersson ......... B60H 1/00792 |
| 2023/0286441 A1 * | 9/2023 | Schnellbach .......... B60Q 3/258 |

* cited by examiner

OVERHEAD CONSOLE ACCESSORY SYSTEM WITH SHARED CONTROLS, CAMERAS, AND LIGHTING

CROSS REFERENCE TO RELATED APPLICATION

The present application claims the filing benefits of U.S. provisional application Ser. No. 63/261,158, filed Sep. 14, 2021, which is hereby incorporated herein by reference in its entirety.

FIELD OF THE INVENTION

The present invention relates generally to the field of interior rearview mirror assemblies and associated accessories for vehicles.

BACKGROUND OF THE INVENTION

It is known to provide a mirror assembly that is adjustably mounted to an interior portion of a vehicle, such as via a double ball pivot or joint mounting configuration where the mirror casing and reflective element are adjusted relative to the interior portion of a vehicle by pivotal movement about the double ball pivot configuration. The mirror casing and reflective element are pivotable about either or both of the ball pivot joints by a user that is adjusting a rearward field of view of the reflective element.

SUMMARY OF THE INVENTION

A vehicular accessory system includes an overhead console that mounts at an interior portion of the vehicle and an interior rearview mirror assembly that attaches to or mounts to or is integrated with the overhead console. The overhead console includes a base portion that is configured to attach at the interior portion of the vehicle to mount the overhead console at the interior portion of the vehicle, and an extending portion that, with the overhead console mounted at the interior portion of the vehicle, extends from the base portion along and spaced from a headliner of the vehicle. The interior rearview mirror assembly includes a mirror head mounted via mounting structure at the overhead console and a mirror reflective element. The overhead console may include an electronic control unit (ECU) that includes electronic circuitry and associated software. The overhead console includes a light source that, with the overhead console mounted at the interior portion of the vehicle, and when the light source is electrically operated to emit light, light emitted by the light source illuminates a surface at the interior portion of the vehicle above the overhead console, such as a headliner of the vehicle or a surface of the overhead console. The vehicular accessory system may include a sensor that captures sensor data and the ECU may include a data processor that processes the captured sensor data for a system of the vehicle.

These and other objects, advantages, purposes and features of the present invention will become apparent upon review of the following specification in conjunction with the drawings.

DESCRIPTION OF THE PREFERRED EMBODIMENTS

Overhead consoles, windshield mounted electronics consoles, interior rearview mirror assemblies with integrated functionality, and other driver-accessible and/or vehicle occupant-accessible electronic modules or components are often installed in vehicles and provide functions that include advanced driver assist systems (ADAS), driver monitoring systems (DMS), occupant monitoring systems (OMS), interior lighting systems, emergency call systems, audio and/or video call systems, and the like. These systems may require electronic components, such as one or more cameras (such as a forward viewing camera having a field of view through the windshield of the vehicle or a driver facing camera at the interior of the vehicle having a field of view that includes a head region of the driver of the vehicle), an electronic control unit (ECU) with electronic circuitry and associated software that includes data and/or image processors, radar, lidar, rain/light/humidity sensor, a human machine interface (HMI) for receiving user inputs, and the like. Commonly, the electronic components enabling these systems are disposed at discrete and remote positions within the vehicle. That is, the necessary components (e.g., sensors, processors, and any driver-accessible controls) for different systems are located at different positions within the vehicle (such as at the overhead console, interior rearview mirror assembly, windshield mounted module, center console, gauge cluster, or projected onto the windshield as a heads up display (HUD)) from the electronic components of other systems. This complicates the controls and information presented to the driver and reduces the driver's ability to control and/or understand such systems, therefore reducing the potential effectiveness of such systems for the driver. Additionally, placing the systems in various positions or integrating the systems into different existing components within the vehicle may result in the multiple systems being hosted across multiple ECUs on multiple printed circuit board assemblies (PCABs), thus complicating the processing and wireless and/or wired communication needs of the systems of the vehicle. Furthermore, the multiple components mount separately at the interior portion of the vehicle, such as to the headliner, the interior facing surface of the windshield, or the dashboard of the vehicle.

Figure 1:
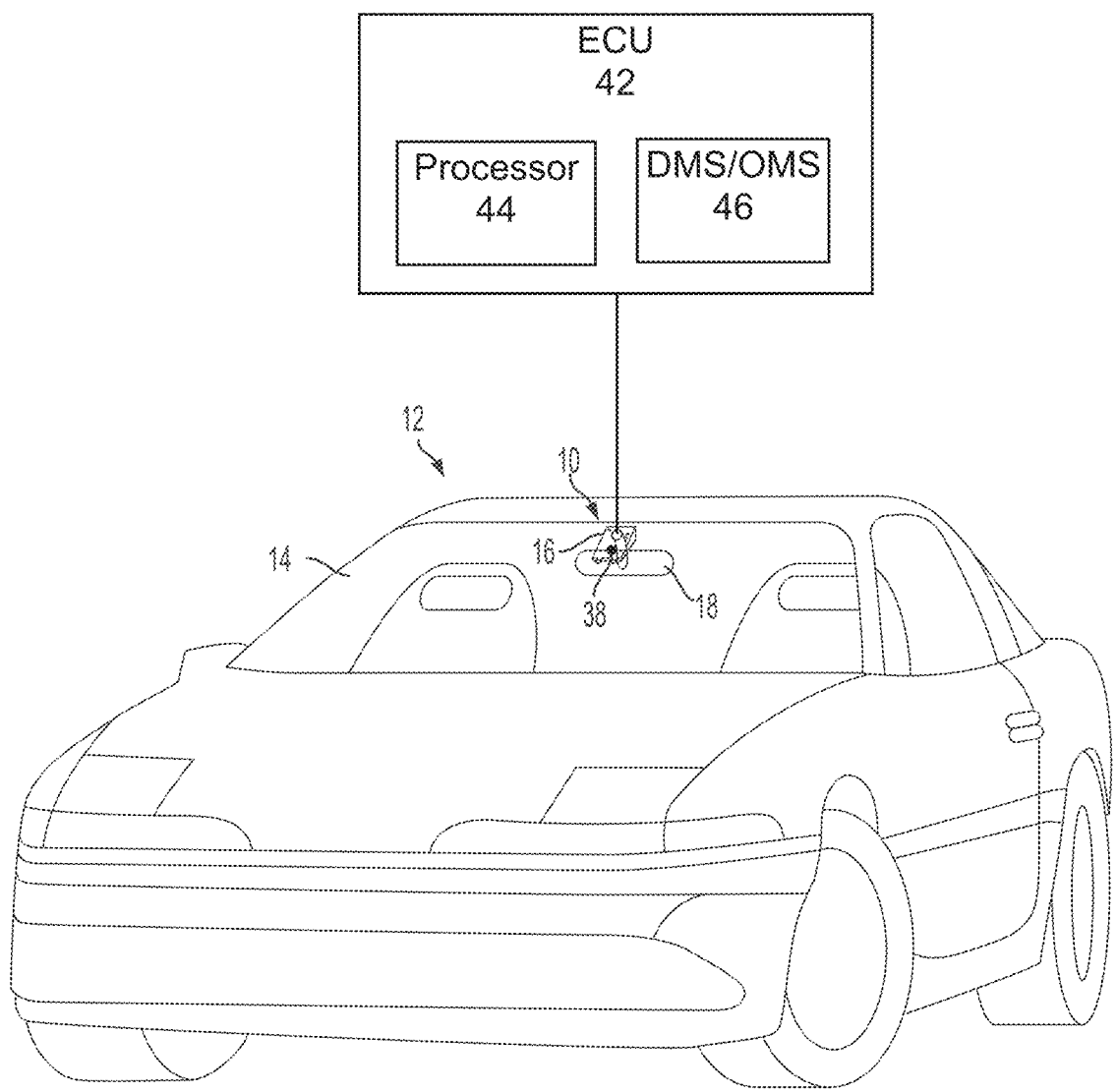
FIG. 1 is a perspective view of a vehicle with a vehicular accessories system disposed at an interior portion of the vehicle.

As described further below, a vehicular accessories system or overhead console is mounted at the interior portion of the vehicle (such as to the windshield or the headliner of the vehicle) and includes or is associated with an interior rearview mirror assembly that provides a view rearward of the vehicle to a driver of the vehicle. Thus, the vehicular accessories system provides a single mounting location for both a vehicular overhead console and interior rearview mirror assembly. As will be discussed below, the overhead console may house electrical components (such as sensors, PCABs, light sources, etc.) for the interior rearview mirror assembly or for other functions of the overhead console or systems of the vehicle. For example, the overhead console may include light sources to provide an interior lighting system of the vehicle. For example, the light sources may provide illumination modules such as for an OMS or DMS, dome lighting, map lights, a gear selector indicator (e.g., PRNDL), an illuminated logo, directional lighting, indirect ambient lighting, galaxy lighting, and/or ambient or accent lighting at the interior portion of the vehicle. The vehicular accessory system may include one or more cameras and/or sensors 38, 40 that capture sensor data and an ECU 42 having an image and/or data processor 44 that processes the captured sensor data for a system (e.g., a DMS/OMS 46) of the vehicle (FIGS. 1 and 2).

Referring now to the drawings and the illustrative embodiments depicted therein, a vehicular accessories system 10 is disposed at an interior portion or cabin of a vehicle 12. As shown in FIG. 1, the vehicular accessories system 10 is mounted at an interior portion of the vehicle, such as at an interior or cabin-facing surface of the windshield 14 of the vehicle 12. The system 10 includes an overhead console 16 and an interior rearview mirror assembly 18 is mounted or attached at the overhead console 16. The interior rearview mirror assembly 18 provides a view to a driver of the vehicle that is rearward of the vehicle. The overhead console 16 houses an electronic control unit (ECU) that includes electronic circuitry and associated software, where the ECU is configured to provide one or more functions of the vehicular accessories system 10. For example, the ECU may provide sensor or image data processing for a system of the vehicle 12 and/or the ECU may be in electronic communication with the interior rearview mirror assembly 18 (e.g., to control electrically operable dimming of the interior rearview mirror). The vehicular accessories system 10 may include one or more sensors that capture sensor data and that are disposed at the overhead console 16, where the captured sensor data is provided to the ECU for processing. Furthermore, one or more electronic components, such as a lighting module or user actuatable input (e.g., a resistive touch or capacitive touch input), may be disposed at the overhead console 16. The vehicular accessories system 10 is electrically powered by a power source of the vehicle, such as via connection to a wiring harness of the vehicle. Thus, the overhead console 16 with the integrated or attached interior rearview mirror assembly 18 provides a module that is mounted at an interior portion of the vehicle and provides processing for a system of the vehicle, one or more sensors or electronic components, and a standard or enhanced interior rearview mirror.

Figure 2:
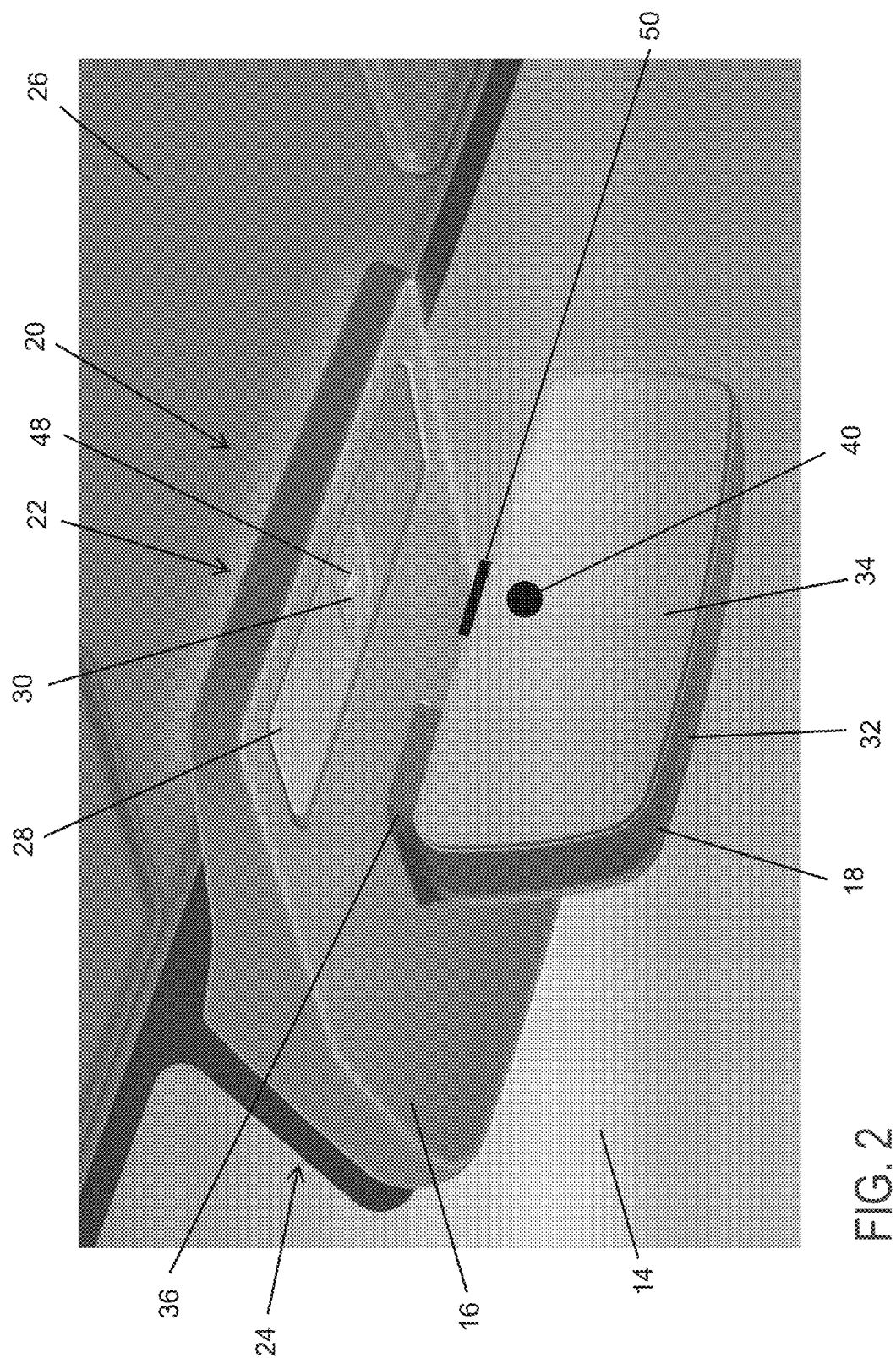
FIG. 2 is a perspective view of an overhead console module and interior rearview mirror assembly of the vehicular accessories system mounted to an inner surface of a windshield at the interior portion of the vehicle.

As shown in FIG. 2, the overhead console 16 is mounted to the interior surface of the windshield 14 and the interior rearview mirror assembly 18 extends from the overhead console 16 to provide the driver of the vehicle the view rearward of the vehicle. The overhead console includes an accent lighting portion or extending portion 20, where a light source 22 (such as a light emitting diode (LED) or plurality of LEDs or vertical-cavity surface-emitting lasers (VCSELs) or the like) disposed at the overhead console 16 may, when electrically operated, illuminate a surface to provide accent lighting at the interior of the vehicle. The surface may include a reflective material such as to better reflect and disperse the light within the vehicle. Optionally, the accent lighting may be adjustable, such as to control the brightness or color of the light emitted by the light sources 22. Furthermore, the accent lighting may be electrically operable responsive to a user input or may be automatically energized, such as responsive to opening of a door of the vehicle. The overhead console 16 may include other light sources, such as illumination modules for DMS and/or OMS (e.g., infrared LEDs or vertical-cavity surface-emitting lasers (VCSELs)).

In the illustrated embodiment, the overhead console 16 includes a mounting portion or base portion 24 mounted at the interior surface of the windshield 14 and the accent lighting portion or extending portion 20 of the overhead console 16 extends from the mounting portion 24 along the headliner 26 of the vehicle and spaced from the headliner 26. The light sources 22 disposed at the overhead console 16 are disposed at the accent light portion 20 and are configured to, when electrically operated, illuminate a portion of the headliner 26 to provide the accent lighting within the vehicle. That is, the mounting portion 24 is mounted at the interior surface of the vehicle and the accent lighting portion 20 extends from the mounting portion 24 and is spaced from the interior surface of the vehicle so that light sources 22 may illuminate the interior surface of the vehicle spaced from the lighting portion 20.

In the illustrated embodiment, the overhead console 16 includes a mounting portion 24 mounted at the interior surface of the windshield 14 and the accent lighting portion 20 of the overhead console 16 extends from the mounting portion 24 along the headliner 26 of the vehicle and spaced from the headliner 26. The light sources 22 disposed at the overhead console 16 are disposed at the accent light portion 20 and are configured to, when electrically operated, illuminate a portion of the headliner 26 to provide the accent lighting within the vehicle. That is, the mounting portion 24 is mounted at the interior surface of the vehicle and the accent lighting portion 20 extends from the mounting portion 24 and is spaced from the interior surface of the vehicle so that light sources 22 may illuminate the interior surface of the vehicle spaced from the lighting portion 20.

Optionally, the accent lighting portion 20 may extend along the headliner 26 of the vehicle and be at least partially mounted at the headliner 26, where the accent lighting portion 20 of the overhead console 16 includes an upper portion and a lower portion. The upper portion may be spaced from the lower portion to define a recess, with the upper portion mounted to the headliner and the lower portion extending along and spaced from the upper portion. The light sources may be disposed in the lower portion and, when electrically operated, illuminate a surface of the upper portion so that light is reflected from the surface and dispersed from the recess between the upper and lower portions to provide the accent lighting at the vehicle. In other words, the mounting portion 24 is mounted at the interior surface of the vehicle and the accent lighting portion 20 extends from the mounting portion 24 along the interior surface of the vehicle. The accent lighting portion 20 includes the upper portion mounted to the interior surface of the vehicle and the lower portion spaced from the upper portion to define the recess or space or gap, where the light sources 22 are disposed in one portion and illuminate the surface of the other portion. For example, the light sources 22 are disposed in the lower portion and illuminate the surface of the upper portion.

Optionally, the mounting portion 24 is mounted at the interior surface of the vehicle and the accent lighting portion 20 extends from the mounting portion 24 and along the interior surface of the vehicle (and the accent lighting portion 20 may be mounted to the interior surface or spaced from the interior surface), where the light sources 22 are disposed at the mounting portion 24 and direct light onto the accent lighting portion 20 to provide accent lighting. That is, the accent lighting portion 20 provides the surface which the light sources 22 at the mounting portion 24 illuminate to provide accent lighting.

The overhead console 16 may include a human machine interface (HMI) 28 configured to receive a user input, such as to control a system of the vehicle or function of the vehicular accessories system 10. In the illustrated embodiment, the HMI 28 is disposed at an underside of the accent lighting portion 20 of the overhead console 16 and includes user actuatable inputs or buttons 30 that, when actuated by a user, control operation of a function of the vehicular accessories system 10. For example, the one or more inputs 30 may control function of reading lights at the overhead console 16 or the accent lighting of the overhead console or a system of the vehicle.

The user actuatable input 30 of the HMI 28 may be provided by any suitable input, such as switches, buttons, or capacitive sensors. Optionally, the user actuatable input 30 of the HMI 28 may be provided by a piezo-electric actuator configured to sense the amount of force provided by a user and provide haptic feedback to the user providing the input. Optionally, the user actuatable inputs 30 may be changeable or adjustable, where the function or control provided by a given input 30 may change responsive to a condition of the vehicle or responsive to another user input. For example, the HMI 28 may provide a series of default functions provided by the user actuatable inputs, and upon selection by a user of one of the user actuatable inputs 30, the HMI may adjust the functions provided by the user actuatable inputs 30 to provide functions based on the initially selected input, such as an initial input selection of a single input to control a sunroof function of the vehicle and subsequent adjustment of the plurality of inputs to provide different functions of the sunroof of the vehicle. In some implementations, an initial input selection to control a heating, ventilation, and air conditioning (HVAC) system of the vehicle adjusts the inputs to allow for more particular control over the HVAC system (e.g., control of the temperature or fan speed).

The one or more inputs 30 may include a display or indicator or icon 48 to indicate to a user the function that would be provided if the user were to select the given input. For example, the input may include a display screen that displays an icon indicating the function or a projector or light source 50 may project light onto the surface of the input 30, where the projection represents the icon. For example a projector 50 may be disposed in the interior rearview mirror assembly 18 or a portion of the overhead console 16 and that projects light upward from the interior rearview mirror assembly 18 onto the surface of the overhead console. The input may be reconfigurable, such that the icon being projected is associated with the current function of the touch sensor. Thus, the icon that is being projected may change with the touch sensor function.

For example, the surface of the overhead console 16 may have a reconfigurable integrated capacitive touch or piezo-electric sensors comprising the HMI 28, so that when the projector projects light onto the surface of the overhead console 16 and a user provides a touch or force at the surface corresponding to a portion of the projected light, the HMI 28 interprets an intended input of the user. Optionally, the HMI 28 may include light sensors so that, when the projector is projecting light onto the overhead console, the sensors may sense an interruption in the light projected onto the surface as an indication of a user input. The HMI 28 and user actuatable input 30 at the overhead console 16 may utilize characteristics of the overhead consoles described in U.S. Patent Pub. No. US-2021-0188092, which is hereby incorporated by reference herein in its entirety.

The interior rearview mirror assembly 18 is mounted to or attached to or integrally formed with the overhead console 16. As shown in the illustrated embodiment, the interior rearview mirror assembly 18 includes a mirror casing or mirror head 32 and a mirror reflective element 34 positioned at a front portion of the casing 32. The interior rearview mirror assembly 18 is adjustably mounted to the overhead console 16 via mounting structure 36. The mirror reflective element 34 may comprise any suitable mirror reflective element, such as a variable reflectance electro-optic mirror reflective element that varies its reflectance responsive to electrical current applied to conductive coatings or layers of the reflective element 34, such as a mirror reflective element that utilizes characteristics of the interior rearview mirror assemblies described in U.S. Pat. Nos. 7,274,501; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference in their entireties. Optionally, the mirror reflective element 34 may comprise a dual-mode interior rearview video mirror that can switch from a traditional reflection mode to a live-video display mode, such as is by utilizing aspects of the mirror assemblies and systems described in U.S. Pat. Nos. 10,442,360; 10,421,404; 10,166,924 and/or 10,046,706, and/or U.S. Publication Nos. US-2021-0245662; US-2021-0162926; US-2021-0155167; US-2020-0377022; US-2019-0258131; US-2019-0146297; US-2019-0118717 and/or US-2017-0355312, which are hereby incorporated herein by reference in their entireties. The video display screen of the video mirror, when the mirror is in the display mode, may display video images derived from video image data captured by a rearward viewing camera, such as a rearward camera disposed at a center high-mounted stop lamp (CHMSL) location, and/or video image data captured by one or more other cameras at the vehicle, such as side-mounted rearward viewing cameras or the like, such as by utilizing aspects of the display systems described in U.S. Publication No. US-2021-0245662, which is hereby incorporated herein by reference in its entirety.

Electronics of the interior rearview mirror assembly 18, such as an ECU that controls automatic dimming of the mirror reflective element 34 responsive to an ambient light sensor, may be disposed in the overhead console 16 and in electrical communication with components of the interior rearview mirror assembly 18 via wiring through the mounting structure 36. Similarly, for a video mirror, an ECU may be disposed in the overhead console 16 having an image processor for processing image data captured by a camera monitoring system (CMS) of the vehicle and for generating video images to be displayed at the mirror reflective element 34 for viewing by a driver of the vehicle. Similarly, actuators configured to adjust positioning of the interior rearview mirror assembly 18 to adjust the view provided to the driver of the vehicle may be disposed in the overhead console 16 to rotate, tilt, and otherwise move the mirror casing 32, mirror reflective element 34, and/or mounting structure 36 (e.g., to pivot or adjust the mirror reflective element within the mirror casing 32 or to pivot or adjust the mirror casing 32 relative to the mounting structure 36). Actuators configured to adjust the interior rearview mirror assembly 18 may optionally provide a memory function of the position of the interior rearview mirror. Disposing the electronic components for controlling the interior rearview mirror within the overhead console 16 allows for a slimmer profile and improved styling of the interior rearview mirror assembly 18 because the electronics need not be disposed within the mirror casing 32.

Optionally, the overhead console 16 includes a dimming screen that stores within the overhead console 16, and when activated, drops from the overhead console to at least partially cover the interior rearview mirror 18 to reduce glare or dim the light reflected by the mirror reflective element 34 to the driver of the vehicle. For example, the dimming screen may include a polarized filter or other, at least partially transparent screen, so that the driver's view rearward of the vehicle via the mirror reflective element is not obstructed by the dimming screen.

The vehicular accessories system 10 may be mounted at the interior cabin of the vehicle in any suitable manner. For example, the overhead console 16 is shown in the illustrated embodiment as mounted to the windshield 14 of the vehicle with a portion of the overhead console 16 extending along and spaced from the headliner 26 of the vehicle without being mounted at the headliner 26. Optionally, the overhead console 16 may be mounted at only the headliner 26 of the vehicle or at both the headliner 26 and the windshield 14 of the vehicle. For example, the overhead console 16 may be mounted to the roof body in white (BIW) like a traditional overhead console with a beauty cover over the sensor. The mounting position of the vehicular accessories system 10 within the vehicle may be configured to appropriately position a sensor 38 integrated with the vehicular accessories system 10. For example, the overhead console 16 may house a camera or imaging sensor 38 that views forward of the vehicle through the windshield 14.

Optionally, one or more sensors 40 (such as a radar sensor or an imaging sensor) may be disposed at the overhead console 16 or rearview mirror assembly 18 and capture data representative of a field of sensing interior of the vehicle and the ECU 42 at the overhead console 16 may process the captured data for a system of the vehicle. For example, an imaging sensor 40 that has a field of view interior the cabin of the vehicle may capture image data and the ECU 42 may process captured image data such as for a DMS or OMS 46 of the vehicle. The location of the camera may be dependent on vehicle styling. The imaging sensor may be disposed at the overhead console 16 and view through an aperture in the housing of the overhead console 16 or the imaging sensor 40 may be disposed at the interior rearview mirror 18. For example, the imaging sensor 40 may be disposed behind the mirror reflective element 34 and view through the mirror reflective element 34 or otherwise integrated with the interior rearview mirror assembly 18. The imaging sensor has a view interior the vehicle, such as at a head region of the driver of the vehicle. Such an imaging sensor that views through the mirror reflective element may utilize characteristics of the DMS described in International Application No. PCT/US2022/072238, filed May 11, 2022 and published Nov. 17, 2022 as International Publication No. WO 2022/241423, and/or International Application No. PCT/US2022/070882, filed Mar. 1, 2022 and published Sep. 9, 2022 as International Publication No. WO 2022/187805, which are hereby incorporated herein by reference in their entireties.

The DMS/OMS or head and face direction and/or position tracking systems and/or eye tracking systems and/or gesture recognition systems may utilize aspects of the systems described in U.S. Pat. Nos. 10,065,574; 10,017,114; 9,405,120 and/or 7,914,187, and/or U.S. Publication Nos. US-2022-0254132; US-2022-0242438; US-2022-0111857; US-2021-0323473; US-2021-0291739; US-2020-0320320; US-2020-0202151; US-2020-0143560; US-2019-0210615; US-2018-0231976; US-2018-0222414; US-2017-0274906; US-2017-0217367; US-2016-0209647; US-2016-0137126; US-2015-0352953; US-2015-0296135; US-2015-0294169; US-2015-0232030; US-2015-0092042; US-2015-0022664; US-2015-0015710; US-2015-0009010 and/or US-2014-0336876, and/or U.S. patent application Ser. No. 17/663,462, filed May 16, 2022, now U.S. Pat. No. 11,930,264, and/or International Application No. PCT/US2022/072238, filed May 11, 2022 and published Nov. 17, 2022 as International Publication No. WO 2022/241423, and/or International Application No. PCT/US2022/070882, filed Mar. 1, 2022 and published Sep. 9, 2022 as International Publication No. WO 2022/187805, which are hereby incorporated herein by reference in their entireties.

Thus, an overhead console has integrated ADAS and includes an electronic control unit (ECU) or electronic processing unit (such as at a printed circuit board or PCBA) for a driver monitoring system (DMS) and an occupant monitoring system (OMS). Optionally, the DMS camera and illumination module may be integrated with the interior mirror assembly 18. The DMS ECU is integrated into the PCBA at the overhead console 16. Cables carrying video signals and power lines are connected between the interior rearview mirror assembly 18 and the overhead console 16, such as within the mounting structure 36.

Optionally, the OMS camera and/or illumination module (separate from the DMS camera and illumination module) may be integrated with the interior rearview mirror assembly 18. Thus, the OMS ECU is integrated into the PCBA of the overhead console 16. Cables carrying video signals and power lines are connected between the interior rearview mirror assembly 18 and the overhead console 16.

Optionally, a single camera, having a wide angle field of view, serves as an imaging sensor capturing image data from both DMS and OMS, and one or more illumination modules are integrated into the interior rearview mirror assembly 18. The DMS/OMS ECU is integrated into the PCBA of the overhead console 16. Cables carrying video signals and power lines are connected between the interior rearview mirror assembly 18 and the overhead console 16.

Optionally, the DMS camera and illumination module are integrated into the overhead console 16. The DMS ECU is integrated into the PCBA of the overhead console 16. Cables carrying video signals and power lines are connected between the ECU PCBA and the camera PCBA.

Optionally, the OMS camera and illumination module may be integrated into the overhead console 16. The OMS ECU is integrated into the PCBA of the overhead console 16. Cables carrying video signals and power lines are connected between the ECU PCBA and the camera PCBA.

Optionally, a single camera, having a wide angle field of view, serves as an imaging sensor capturing image data from both DMS and OMS, and one or more illumination modules are integrated into the overhead console 16. The DMS/OMS ECU is integrated into the PCBA of the overhead console 16. Cables carrying video signals and power lines are connected between the ECU PCBA and the camera PCBA.

Optionally, an imaging sensor may capture sensor data representative of the interior cabin of the vehicle and display images representative of the captured image data at the mirror reflective element 34, in cooperation with a video mirror reflective element as described above. For example, the displayed images may be for a baby monitoring system and display picture-in-picture with the rearview images of the mirror reflective element 34.

Optionally, the display of the video mirror may display telltales or indicators, such as, for example, an 'are we there yet?' indicator or estimated time of arrival or remaining travel time or other dials or status indicators, related to functions of the overhead console.

Optionally, a short-range radar is integrated into the overhead console 16 with an antenna of the radar facing interior of the vehicle for OMS. The OMS ECU may be integrated into the PCBA of the overhead console 16. Data captured by the short-range radar may be processed for a system of the vehicle, such as the DMS or a gesture monitoring system utilizing characteristics of those gesture monitoring systems described in U.S. Patent Publication No. US-2019-0210615, which is hereby incorporated herein by reference in its entirety. Such a gesture monitoring system may cooperate with the HMI 28, such as to actuate or adjust the user actuatable inputs 30. A gesture monitoring system having a gesture control sensor may similarly be disposed at the interior rearview mirror 18. For example, an infrared sensor and infrared LED may be disposed behind the mirror reflective element 34 or the gesture monitoring system may process image data captured by the OMS and/or DMS camera disposed at the interior rearview mirror assembly 18. A gesture monitoring system disposed at the interior rearview mirror assembly 18 may provide a better location to avoid false trips from a user reaching for other components at the overhead console 16.

Optionally, other sensors may be disposed at the overhead console 16 or interior rearview mirror assembly 18 that capture data representative of a field of sensing of the interior of the vehicle and that transmit the captured data for processing by the ECU at the overhead console 16. For example, a microphone, such as an advanced directional microphone, may be disposed at the vehicular accessories system 10, such as at the overhead console 16 or the interior rearview mirror assembly 18, for capturing audio data, such as for a voice control module or hands free calling (instead of in the headliner, for example).

The vehicular accessories system 10 may include one or more sensors that capture data representative of a field of sensing exterior the vehicle and the ECU at the overhead console 16 may process the captured data for a system of the vehicle. For example, the overhead console 16 may be mounted at least partially to the interior or cabin-facing surface of the windshield 14 and include one or more sensors that view forward of the vehicle through the windshield 14 and that captures sensor data representative of a field of view forward of the vehicle. The ECU may process transmitted captured image data such as for a vision system of the vehicle that performs object detection, for a dashcam or security camera that records video images, to provide augmented reality, or for an ADAS that provides varying levels of autonomous control of the vehicle.

Optionally, other sensors may be disposed at the overhead console 16 or interior rearview mirror assembly 18 that capture data representative of a field of sensing exterior the vehicle and that the ECU at the overhead console 16 may process the captured data for a system of the vehicle. For example, an ambient light sensor may sense ambient light at the vehicle such as for intelligent dimming of the interior rearview mirror reflective element 34. Intelligent dimming provides improved interior rearview mirror styling. Optionally, image data captured by a camera (such as a camera that captures image data for DMS and/or OMS) may be processed to determine ambient light at the vehicle. Optionally, the vehicular accessories system 10 may include a rain sensor.

Optionally, when mounted at least partially at the windshield 14 of the vehicle, the vehicular accessory system 10 may be configured to defrost at least a portion of the windshield of the vehicle 12, such as at a sensor farm area of the windshield to clear a portion of the windshield for viewing of a sensor through the portion of the windshield. For example, heating elements may be disposed within the overhead console 16 and adjacent the inner surface of the windshield 14.

Optionally, the overhead console 16 may be mounted to the headliner 24 of the vehicle and extend from the front portion of the cabin (i.e., near the windshield) to the rear portion of the cabin (i.e., near the rear window of the vehicle). That is, the overhead console 16 may extend along the vehicle roof to the back of the vehicle. In such implementations, the overhead console 16 may include a camera at the rear portion of the vehicle that views through the back window of the vehicle and captures image data representative of a field of view exterior and rearward of the vehicle, such as for a backup camera and/or CMS of the vehicle. The overhead console that extends from the front portion of the vehicle to the rear portion of the vehicle may include dome lights for rear seat passengers, video screens for displaying media to rear seat passengers (with obstruction of the rearview mirror by the video screens mitigated by a video mirror reflective element), cosmetic mirrors for rear seat passengers, controls for a heating, ventilation, and air conditioning (HVAC) system of the vehicle, grab handles, storage compartments, secondary microphones for capturing audio data from the rear portion of the interior cabin of the vehicle (which may provide noise canceling for cabin noise) for conversation enhancement through the vehicle, an intercom system, audio speakers, mobile device compartments (that may be configured to provide charging or cleaning of mobile devices), USB or other charging points, heating elements, solar panels through the sunroof (instead of splitting sunroofs), and/or other vehicular accessories. The overhead console that extends from the front toward the rear of the vehicle may be at least partially recessed or embedded into the headliner of the vehicle to reduce obstruction of the driver's view.

Optionally, the overhead console 16 may be integrated or mounted directly to the roof or sunroof or moon roof of the vehicle, such that a surface of the vehicular accessory system is exposed exterior of the vehicle or is disposed at an at least partially transparent surface (e.g., glass) of the roof of the vehicle. The vehicular accessory system 10 may thus include solar cells to perform power harvesting (i.e., capture solar energy) as a power source for the vehicle and/or vehicular accessory system 10. The vehicular accessory system 10 may include an antenna, such as an omnidirectional antenna and/or a radio or communications antenna that is tied into the roof or body of the vehicle. Optionally, the vehicular accessory system 10 includes a roof zone or domain controller (e.g., drivers for the sunroof or moon roof of the vehicle, lighting, etc.).

Optionally, the overhead console module 16 of the vehicular accessories system is mounted to the windshield 14 only. Mounting to the windshield allows for compatibility with the sensor farm, such as providing a centrally mounted ADAS camera (as discussed above), while still allowing for optimal location and mounting of the interior rearview mirror assembly 18. Mounting to the windshield 14 may also provide thermal management improvements, such as a combined heat sink, a combined chassis, and/or a combined cooling fan for the sensors and electronics at the vehicular accessories system 10 as well as airflow opportunities. For example, the vehicular accessories system may mitigate the solar load on electronics. Optionally, a beauty cover may be integrated into the overhead console 16, which may eliminate the need for a separate part.

Floating the overhead console 16 under the headliner, such as in the illustrated embodiment, allows for indirect lighting, increased HMI real estate, a storage location, and/or a grab handle.

Optionally, the vehicular accessories system 10 is configured to be a modular component that may be installed in a plurality of different vehicle interiors, where the plurality of different vehicle interiors have a universal mounting portion configured to receive the vehicular accessories system 10 and the mount of the vehicular accessories system 10 may be adjustable to accommodate various windshield angles. Thus, the overhead console may be modular to allow carryover for different vehicle models.

A vehicular accessories system that includes an overhead console and an interior rearview mirror requires levels of integration between components, such as a level of mechanical integration (e.g., for ADAS camera, interior viewing camera, and lidar sensors), a level of mechanical and electrical integration (e.g., for UWB antennas, interior facing radar (60 GHz)), a level of mechanical, electrical, and software (interface only) integration, and/or a level of mechanical, electrical, and software (interface and logic) integration (e.g., rain/light/humidity sensor, interior rearview mirror, EC mirror dimming driver circuitry, general light, reading light, SIM card, defrost function, hazard light button, on-call, SOS, airborne particulate sensor, interior radar, lidar, ADAS camera, and/or interior viewing camera, etc.). Optionally, the overhead console module may include an e-call speaker, a passenger airbag indicator light, a rear overhead light, a driver's reading light, a dome lamp (dual light), a light jewel, a seat belt warning (e.g., second row), a hazard switch, a California Mode switch, an e-call switch, a passenger's reading light, and/or a moon roof switch.

Thus, a vehicular accessories system includes an overhead console and interior rearview mirror attached to or mounted to or integrated with the overhead console. The overhead console includes an ECU that includes electronic circuitry and associated software for a system of the vehicle. The overhead console may include an accent lighting portion where light sources of the overhead console illuminate a surface at the interior portion of the vehicle to provide accent lighting. For example, the light sources may illuminate the headliner of the vehicle or an upper surface of the overhead console.

The mirror reflective element and mirror casing are adjustable relative to the mounting structure or the overhead console to adjust the driver's rearward field of view when the mirror assembly is normally mounted at or in the vehicle. The mounting structure may comprise a single-ball or single-pivot mounting assembly, whereby the reflective element and casing are adjustable about a single pivot joint, or the mounting assembly may comprise other types of mounting configurations, such as a double-ball or double-pivot mounting configuration or the like. The socket or pivot element is configured to receive a ball member of the base portion, such as for a single pivot or single ball mounting structure or a double pivot or double ball mounting structure or the like (such as a pivot mounting assembly of the types described in U.S. Pat. Nos. 6,318,870; 6,593,565; 6,690,268; 6,540,193; 4,936,533; 5,820,097; 5,100,095; 7,249,860; 6,877,709; 6,329,925; 7,289,037; 7,249,860 and/or 6,483,438, which are hereby incorporated herein by reference in their entireties).

The mirror assembly may comprise any suitable construction, such as, for example, a mirror assembly with the reflective element being nested in the mirror casing and with a bezel portion that circumscribes a perimeter region of the front surface of the reflective element, or with the mirror casing having a curved or beveled outermost exposed perimeter edge around the reflective element and with no overlap onto the front surface of the reflective element (such as by utilizing aspects of the mirror assemblies described in U.S. Pat. Nos. 7,184,190; 7,274,501; 7,255,451; 7,289,037; 7,360,932; 7,626,749; 8,049,640; 8,277,059 and/or 8,529,108, which are hereby incorporated herein by reference in their entireties) or such as a mirror assembly having a rear substrate of an electro-optic or electrochromic reflective element nested in the mirror casing, and with the front substrate having a curved or beveled outermost exposed perimeter edge, or such as a mirror assembly having a prismatic reflective element that is disposed at an outer perimeter edge of the mirror casing and with the prismatic substrate having a curved or beveled outermost exposed perimeter edge, such as described in U.S. Pat. Nos. 9,827,913; 9,174,578; 8,508,831; 8,730,553; 9,598,016 and/or 9,346,403, and/or U.S. Des. Pat. Nos. D633,423; D633,019; D638,761 and/or D647,017, which are hereby incorporated herein by reference in their entireties (and with electrochromic and prismatic mirrors of such construction are commercially available from the assignee of this application under the trade name INFINITY™ mirror).

Optionally, for example, the interior rearview mirror assembly may comprise a prismatic mirror assembly, such as the types described in U.S. Pat. Nos. 7,289,037; 7,249,860; 6,318,870; 6,598,980; 5,327,288; 4,948,242; 4,826,289; 4,436,371 and/or 4,435,042, and/or U.S. Publication No. US-2010-0085653, which are hereby incorporated herein by reference in their entireties. Optionally, the prismatic reflective element may comprise a conventional prismatic reflective element or prism or may comprise a prismatic reflective element of the types described in U.S. Pat. Nos. 7,420,756; 7,289,037; 7,274,501; 7,249,860; 7,338,177 and/or 7,255,451, which are all hereby incorporated herein by reference in their entireties, without affecting the scope of the present invention.

The vehicular accessory system may include user actuatable inputs operable to control any of the accessories of or associated with the vehicular accessory system (e.g., telematics buttons). For example, the vehicular accessory system may include touch sensitive elements or touch sensors or proximity sensors, such as the types of touch sensitive elements described in U.S. Pat. Nos. 5,594,222; 6,001,486; 6,310,611; 6,320,282; 6,627,918; 7,224,324 and/or 7,253,723, and/or U.S. Publication Nos. US-2014-0022390 and/or US-2014-0293169, which are hereby incorporated herein by reference in their entireties, or such as proximity sensors of the types described in U.S. Pat. Nos. 7,224,324; 7,249,860 and/or 7,446,924, and/or U.S. Publication No. US-2006-0050018, which are hereby incorporated herein by reference in their entireties, or such as membrane type switches, such as described in U.S. Pat. No. 7,360,932, which is hereby incorporated herein by reference in its entirety, or such as detectors and the like, such as the types disclosed in U.S. Pat. Nos. 7,255,541; 6,504,531; 6,501,465; 6,492,980; 6,452,479; 6,437,258 and/or 6,369,804, which are hereby incorporated herein by reference in their entireties, and/or the like, while remaining within the spirit and scope of the present invention.

Optionally, the vehicular accessory system may include one or more other displays, such as the types disclosed in U.S. Pat. Nos. 5,530,240 and/or 6,329,925, which are hereby incorporated herein by reference in their entireties, and/or display-on-demand transflective type displays, and/or video displays or display screens, such as the types disclosed in U.S. Pat. Nos. 8,890,955; 7,855,755; 7,338,177; 7,274,501; 7,255,451; 7,195,381; 7,184,190; 7,046,448; 5,668,663; 5,724,187; 5,530,240; 6,329,925; 6,690,268; 7,734,392; 7,370,983; 6,902,284; 6,428,172; 6,420,975; 5,416,313;

5,285,060; 5,193,029 and/or 4,793,690, and/or in U.S. Pat. Pub. Nos. US-2006-0050018; US-2009-0015736; US-2009-0015736; and/or US-2010-0097469, which are all hereby incorporated herein by reference in their entireties.

The video display screen may be controlled or operable in response to an input or signal, such as a signal received from one or more cameras or image sensors of the vehicle, such as a video camera or sensor, such as a CMOS imaging array sensor, a CCD sensor or the like, and image processors or image processing techniques, such as utilizing aspects of the cameras and image processors described U.S. Pat. Nos. 5,550,677; 5,670,935; 5,760,962; 6,498,620; 6,396,397; 6,222,447; 6,201,642; 6,097,023; 5,877,897; 5,796,094; 5,715,093; 6,922,292; 6,757,109; 6,717,610; 6,590,719; 6,320,176; 6,559,435; 6,831,261; 6,806,452; 6,822,563; 6,946,978; 7,038,577; 7,004,606 and/or 7,720,580, and/or U.S. Pat. Pub. Nos. US-2006-0171704; US-2009-0244361 and/or US-2010-0214791, and/or International Publication Nos. WO 2009/046268 and/or WO 2009/036176, which are all hereby incorporated herein by reference in their entireties, or from one or more imaging systems of the vehicle, such as a reverse or backup aid system, such as a rearwardly directed vehicle vision system utilizing principles disclosed in U.S. Pat. Nos. 5,550,677; 5,760,962; 5,670,935; 6,201, 642; 6,396,397; 6,498,620; 6,717,610 and/or 6,757,109, which are hereby incorporated herein by reference in their entireties, a trailer hitching aid or tow check system, such as the type disclosed in U.S. Pat. No. 7,005,974, which is hereby incorporated herein by reference in its entirety, a cabin viewing or monitoring device or system, such as a baby viewing or rear seat viewing camera or device or system or the like, such as disclosed in U.S. Pat. Nos. 5,877,897 and/or 6,690,268, which are hereby incorporated herein by reference in their entireties, a video communication device or system, such as disclosed in U.S. Pat. No. 6,690,268, which is hereby incorporated herein by reference in its entirety, and/or the like. The imaging sensor or camera may be activated and the display screen may be activated in response to the vehicle shifting into reverse, such that the display screen is viewable by the driver and is displaying an image of the rearward scene while the driver is reversing the vehicle. It is envisioned that an image processor or ECU (such as an EYEQ™ image processing chip available from Mobileye Vision Technologies Ltd. of Jerusalem, Israel, and such as an image processor of the types described in U.S. Pat. No. 9,126,525, which is hereby incorporated herein by reference in its entirety) may process image data captured by the rearward facing camera to assess glare lighting conditions (such as to detect headlights of following vehicles that may cause glare at the interior and/or exterior rearview mirror assemblies of the equipped vehicle), and the ECU may adjust or control the dimming of the electro-optic mirror assembly or assemblies of the equipped vehicle responsive to such image processing.

Optionally, the driver monitoring system may be integrated with a camera monitoring system (CMS) of the vehicle. The integrated vehicle system incorporates multiple inputs, such as from the inward viewing or driver monitoring camera and from the forward or outward viewing camera, as well as from a rearward viewing camera and sideward viewing cameras of the CMS, to provide the driver with unique collision mitigation capabilities based on full vehicle environment and driver awareness state. The image processing and detections and determinations are performed locally within the interior rearview mirror assembly and/or the overhead console region, depending on available space and electrical connections for the particular vehicle application.

The CMS cameras and system may utilize aspects of the systems described in U.S. Publication Nos. US-2021-0245662; US-2021-0162926; US-2021-0155167; US-2018-0134217 and/or US-2014-0285666, and/or International Publication No. WO 2022/150826, which are all hereby incorporated herein by reference in their entireties.

The ECU may receive image data captured by a plurality of cameras of the vehicle, such as by a plurality of surround view system (SVS) cameras and a plurality of camera monitoring system (CMS) cameras and optionally one or more driver monitoring system (DMS) cameras. The ECU may comprise a central or single ECU that processes image data captured by the cameras for a plurality of driving assist functions and may provide display of different video images to a video display screen in the vehicle (such as at an interior rearview mirror assembly or at a central console or the like) for viewing by a driver of the vehicle. The system may utilize aspects of the systems described in U.S. Pat. Nos. 10,442,360 and/or 10,046,706, and/or U.S. Publication Nos. US-2021-0245662; US-2021-0162926; US-2021-0155167 and/or US-2019-0118717, and/or International Publication No. WO 2022/150826, which are all hereby incorporated herein by reference in their entireties.

Optionally, the mirror assembly and/or any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and/or 6,124,886, which are hereby incorporated herein by reference in their entireties.

Optionally, the mirror assembly (such as at the mounting base, which may be fixed relative to the vehicle windshield) may include an imaging sensor (such as a forward facing imaging sensor or camera that has a forward field of view through the vehicle windshield) that may be part of or may provide an image output for a vehicle vision system, such as a headlamp control system or lane departure warning system or object detection system or other vehicle vision system or the like, and may utilize aspects of various imaging sensors or imaging array sensors or cameras or the like, such as a CMOS imaging array sensor, a CCD sensor or other sensors or the like, such as the types described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281 which are hereby incorporated herein by reference in their entireties.

Optionally, the accessory or accessories, such as those described above, may be positioned at or within the mirror casing and/or mirror cap portion or the like, and may be included on or integrated in a printed circuit board positioned within the mirror casing and/or cap portion, such as along a rear surface of the reflective element or elsewhere within a cavity defined by the casing, without affecting the scope of the present invention. The user actuatable inputs and/or touch sensors and/or proximity sensors and displays described above may be actuatable to control and/or adjust the accessories of the mirror assembly/system and/or overhead console and/or accessory module and/or vehicle. The connection or link between the controls and the display screen device and/or the navigation system and/or other systems and accessories of the mirror system may be provided via vehicle electronic or communication systems and the like, and may be connected via various protocols or nodes, such as BLUETOOTH®, SCP, UBP, J1850, CAN J2284, Fire Wire 1394, MOST, LIN, FlexRay™, Byte Flight and/or the like, or other vehicle-based or in-vehicle communication links or systems (such as WIFI and/or IRDA) and/or the like, or via VHF or UHF or other wireless transmission formats, depending on the particular application of the mirror/accessory system and the vehicle. Optionally, the connections or links may be provided via various wireless connectivity or links, without affecting the scope of the present invention.

Changes and modifications in the specifically described embodiments may be carried out without departing from the principles of the present invention, which is intended to be limited only by the scope of the appended claims as interpreted according to the principles of patent law.

The invention claimed is:

1. A vehicular accessory system, the vehicular accessory system comprising:
    an overhead console configured to mount at an interior portion of a vehicle equipped with the vehicular accessory system;
    wherein the overhead console comprises (i) a base portion that is configured to attach at the interior portion of the vehicle to mount the overhead console at the interior portion of the vehicle and (ii) an extending portion that, with the overhead console mounted at the interior portion of the vehicle, extends from the base portion along and spaced from a headliner of the vehicle;
    an interior rearview mirror assembly comprising a mirror head mounted via mounting structure at the overhead console, wherein the mirror head comprises a mirror reflective element; and
    wherein the overhead console comprises a light source, and wherein, with the overhead console mounted at the interior portion of the vehicle, and when the light source is electrically operated to emit light, light emitted by the light source illuminates a surface at the interior portion of the vehicle above the overhead console.

2. The vehicular accessory system of claim 1, wherein, with the overhead console mounted at the interior portion of the vehicle, and when the light source is electrically operated to emit light, light emitted by the light source illuminates the headliner of the vehicle.

3. The vehicular accessory system of claim 1, wherein the interior portion of the vehicle comprises an upper region of a windshield of the vehicle.

4. The vehicular accessory system of claim 1, wherein the base portion of the overhead console, with the overhead console mounted at the interior portion of the vehicle, is disposed at the headliner of the vehicle, and wherein the extending portion, with the base portion disposed at the headliner of the vehicle, is below the base portion, and wherein, when the light source is electrically operated to emit light, light emitted by the light source illuminates a surface of the base portion.

5. The vehicular accessory system of claim 1, wherein the base portion of the overhead console, with the overhead console mounted at the interior portion of the vehicle, is mounted at an upper region of a windshield of the vehicle, and wherein the extending portion, with the base portion mounted at the upper region of the windshield of the vehicle, is disposed below and is spaced from the headliner, and wherein, when the light source is electrically operated to emit light, light emitted by the light source illuminates the headliner.

6. The vehicular accessory system of claim 1, wherein the surface at the interior portion of the vehicle comprises the headliner of the vehicle.

7. The vehicular accessory system of claim 1, further comprising a sensor operable to capture sensor data, wherein the sensor is disposed at one selected from the group consisting of (i) the overhead console and (ii) the mirror head, and wherein an electronic control unit (ECU) comprising electronic circuitry and associated software is disposed at the overhead console, and wherein the ECU includes a data processor operable to process sensor data captured by the sensor for a system of the vehicle.

8. The vehicular accessory system of claim 7, wherein the interior portion of the vehicle comprises an upper region of a windshield of the vehicle, and wherein the sensor is disposed at the overhead console.

9. The vehicular accessory system of claim 8, wherein the sensor comprises an imaging sensor that, with the overhead console mounted at the upper region of the windshield of the vehicle, views through the windshield.

10. The vehicular accessory system of claim 7, wherein the sensor comprises an imaging sensor, and wherein, with the overhead console mounted at the interior portion of the vehicle, the imaging sensor views at least a head region of a driver of the vehicle, and wherein the imaging sensor captures image data for a driver monitoring system of the vehicle.

11. The vehicular accessory system of claim 10, wherein the imaging sensor is disposed at the mirror head and views through the mirror reflective element.

12. The vehicular accessory system of claim 7, wherein the mirror reflective element comprises an electro-optic variable reflectance mirror reflective element, and wherein the vehicular accessory system, based on processing at the ECU of captured sensor data, adjusts dimming of the mirror reflective element.

13. The vehicular accessory system of claim 7, wherein the overhead console comprises a user actuatable input that, when operated by a user, provides an input to the system of the vehicle.

14. The vehicular accessory system of claim 13, wherein the light source projects an icon to indicate a function of the user actuatable input.

15. A vehicular accessory system, the vehicular accessory system comprising:
    an overhead console configured to mount at an interior portion of a vehicle equipped with the vehicular accessory system;
    wherein the overhead console comprises a base portion that is configured to attach at the interior portion of the vehicle to mount the overhead console at the interior portion of the vehicle;
    an interior rearview mirror assembly comprising a mirror head mounted via mounting structure at the overhead console, wherein the mirror head comprises a mirror reflective element;
    wherein the overhead console comprises a user actuatable input that, when operated by a user, provides an input to a system of the vehicle;
    wherein the interior rearview mirror assembly comprises a light source that is electrically operable to emit light;
    wherein, with the overhead console mounted at the interior portion of the vehicle, and when the light source is electrically operated to emit light, light emitted by the light source illuminates a surface of the overhead console;

wherein the light source, when electrically operated to emit light, projects an icon to indicate a function of the user actuatable input; and wherein the overhead console comprises an extending portion that, with the overhead console mounted at the interior portion of the vehicle, extends from the base portion along and spaced from a headliner of the vehicle, and wherein a second light source is disposed at the extending portion of the overhead console, and wherein, when the second light source is electrically operated to emit light, light emitted by the second light source illuminates a surface at the interior portion of the vehicle.

16. The vehicular accessory system of claim 15, wherein the interior portion of the vehicle comprises an upper region of a windshield of the vehicle.

17. The vehicular accessory system of claim 15, wherein the base portion of the overhead console, with the overhead console mounted at the interior portion of the vehicle, is disposed at the headliner of the vehicle, and wherein the extending portion, with the base portion disposed at the headliner of the vehicle, is below the base portion, and wherein, when the second light source is electrically operated to emit light, light emitted by the second light source illuminates a surface of the base portion.

18. The vehicular accessory system of claim 15, wherein the base portion of the overhead console, with the overhead console mounted at the interior portion of the vehicle, is mounted at an upper region of a windshield of the vehicle, and wherein the extending portion, with the base portion mounted at the upper region of the windshield of the vehicle, is disposed below and is spaced from the headliner, and wherein, when the second light source is electrically operated to emit light, light emitted by the second light source illuminates the headliner.

19. A vehicular accessory system, the vehicular accessory system comprising:

an overhead console configured to mount at an interior portion of a vehicle equipped with the vehicular accessory system;

wherein the overhead console comprises a base portion that is configured to attach at the interior portion of the vehicle to mount the overhead console at the interior portion of the vehicle;

an interior rearview mirror assembly comprising a mirror head mounted via mounting structure at the overhead console, wherein the mirror head comprises a mirror reflective element;

wherein the overhead console comprises a user actuatable input that, when operated by a user, provides an input to a system of the vehicle;

wherein the interior rearview mirror assembly comprises a light source that is electrically operable to emit light;

wherein, with the overhead console mounted at the interior portion of the vehicle, and when the light source is electrically operated to emit light, light emitted by the light source illuminates a surface of the overhead console;

wherein the light source, when electrically operated to emit light, projects an icon to indicate a function of the user actuatable input; and wherein an electronic control unit (ECU) comprising electronic circuitry and associated software is disposed at the overhead console, and wherein the ECU is operable to provide the input to the system of the vehicle.

20. A vehicular accessory system, the vehicular accessory system comprising:

an overhead console configured to mount at an interior portion of a vehicle equipped with the vehicular accessory system;

wherein the overhead console comprises (i) a base portion that is configured to attach at a headliner of the vehicle to mount the overhead console at the interior portion of the vehicle and (ii) an extending portion that, with the overhead console mounted at the interior portion of the vehicle, extends from the base portion;

wherein the extending portion, with the base portion attached at the headliner of the vehicle, is below and spaced from the base portion;

an interior rearview mirror assembly comprising a mirror head mounted via mounting structure at the overhead console, wherein the mirror head comprises a mirror reflective element;

wherein the overhead console comprises a light source disposed at the extending portion of the overhead console, and wherein, with the overhead console mounted at the interior portion of the vehicle, and when the light source is electrically operated to emit light, light emitted by the light source illuminates a surface of the base portion; and wherein a sensor operable to capture sensor data is disposed at one selected from the group consisting of (i) the overhead console and (ii) the mirror head, and wherein an electronic control unit (ECU) is disposed at the overhead console, wherein the ECU comprises electronic circuitry and associated software, and wherein the ECU includes a data processor operable to process sensor data captured by the sensor for a system of the vehicle.

21. The vehicular accessory system of claim 20, wherein the sensor comprises an imaging sensor that, with the overhead console mounted at the upper region of the windshield of the vehicle, views through the windshield.

22. The vehicular accessory system of claim 20, wherein the sensor comprises an imaging sensor, and wherein, with the overhead console mounted at the interior portion of the vehicle, the imaging sensor views at least a head region of a driver of the vehicle, and wherein the imaging sensor captures image data for a driver monitoring system of the vehicle.

23. The vehicular accessory system of claim 22, wherein the imaging sensor is disposed at the mirror head and views through the mirror reflective element.

24. The vehicular accessory system of claim 20, wherein the overhead console comprises a user actuatable input that, when operated by a user, provides an input to a system of the vehicle.

25. The vehicular accessory system of claim 24, wherein the light source, when electrically operated to emit light, projects an icon to indicate a function of the user actuatable input.

\* \* \* \* \*

UNITED STATES PATENT AND TRADEMARK OFFICE
CERTIFICATE OF CORRECTION

| | | |
|---|---|---|
| PATENT NO. | : 12,479,358 B2 | Page 1 of 1 |
| APPLICATION NO. | : 17/931988 | |
| DATED | : November 25, 2025 | |
| INVENTOR(S) | : Austen C. Peterson et al. | |

It is certified that error appears in the above-identified patent and that said Letters Patent is hereby corrected as shown below:

In the Specification

<u>Column 4</u>
Lines 14-28, remove the following duplicative paragraph:
"In the illustrated embodiment, the overhead console 16 includes a mounting portion 24 mounted at the interior surface of the windshield 14 and the accent lighting portion 20 of the overhead console 16 extends from the mounting portion 24 along the headliner 26 of the vehicle and spaced from the headliner 26. The light sources 22 disposed at the overhead console 16 are disposed at the accent light portion 20 and are configured to, when electrically operated, illuminate a portion of the headliner 26 to provide the accent lighting within the vehicle. That is, the mounting portion 24 is mounted at the interior surface of the vehicle and the accent lighting portion 20 extends from the mounting portion 24 and is spaced from the interior surface of the vehicle so that light sources 22 may illuminate the interior surface of the vehicle spaced from the lighting portion 20."

Signed and Sealed this
Twenty-third Day of December, 2025

John A. Squires
*Director of the United States Patent and Trademark Office*